A. ROSE.
IMPLEMENT FOR WEEDING AND THINNING PLANTS AND OTHER PURPOSES.
APPLICATION FILED AUG. 28, 1914.
1,128,051.
Patented Feb. 9, 1915.
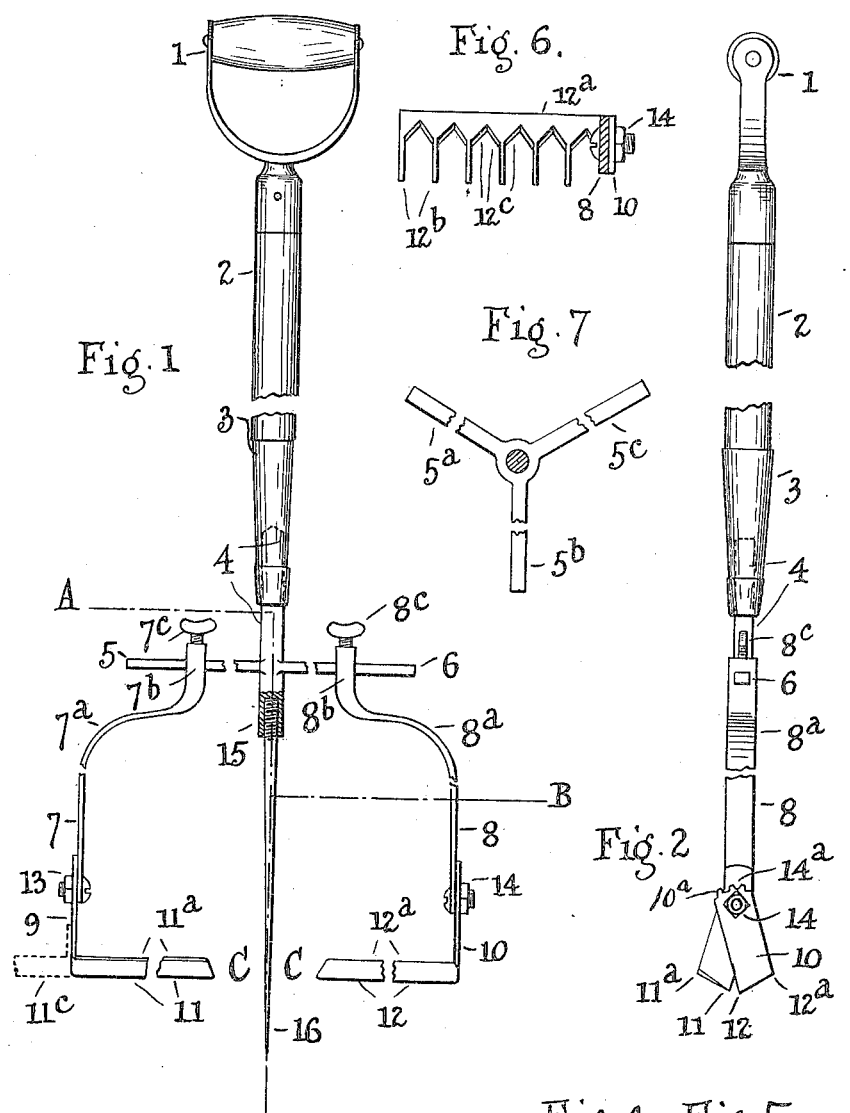

UNITED STATES PATENT OFFICE.

ALEXANDER ROSE, OF HEART ESTATE, SALE, VICTORIA, AUSTRALIA.

IMPLEMENT FOR WEEDING AND THINNING PLANTS AND OTHER PURPOSES.

1,128,051. Specification of Letters Patent. Patented Feb. 9, 1915.

Application filed August 28, 1914. Serial No. 859,098.

*To all whom it may concern:*

Be it known that I, ALEXANDER ROSE, a subject of the King of Great Britain and Ireland, &c., residing at Heart Estate, Sale, in the State of Victoria, Commonwealth of Australia, have invented certain new and useful Improvements in Implements for Weeding and Thinning Plants and other Purposes; and I do hereby declare the following to be a full, clear, and exact description of the invention, such as will enable others skilled in the art to which it appertains to make and use the same.

The object of this invention is to provide means for plant weeding and thinning and cultivating or loosening soil to put it into a desirable condition. In a simple form the invention can be embodied in a hand tool, having a suitable part to be gripped, a stem or handle, a prong carrier, adjustable prongs, and, attached to the latter, members to enter the soil and treat it. These members may be changed at will and comprise root cutting knives, hoe blades, or rake teeth, or a combination of such attachments.

The present implement is particularly useful, as it can treat ground very close up to small plants without injuring the latter. It will treat annular areas, the diameter and the thickness of the annulus treated being variable according to the attachments used and their locations; and if it is desired that the center be not left untreated, that is easily arranged.

The wooden or metal handle will as it is rotated be pressed down to sink the knives, blades or teeth sufficiently in the soil, their progress being screw like, and they may be extracted by vertically lifting the handle, or if disturbance of the surface of the soil is to be minimized, by reverse rotation of the parts. In many cases weeding does not require deep insertion of cutters below the surface, and does not require much strength, and thus this hand tool proves effective when simply inserted, rotated about 180°, and extracted. This is when there are two prongs, so that when it has three prongs a rotation of about 120° suffices, and still less with four prongs, as will be understood by reference to the accompanying drawings, by the aid of which the invention will now be further explained.

Figure 1 is a front elevation, partly sectional, of a two-pronged implement and Fig. 2 is a side elevation of that implement. Fig. 3 is a plan of the parts in Fig. 1 in section on lines A—B. Details are shown in Figs. 4 to 7, the scale of Figs. 4 to 6 being larger than that of the other views.

A light implement can generally be swung to and fro while the user holds the grip 1 in one hand, but other forms of handle top may be used and heavier implements might be actuated by using two hands.

The implement is simple, worn parts can be easily replaced and it is adapted to a wide range of serviceability.

It is not intended to limit the invention as to the numbers or designs of such parts as prongs, and earth treating members.

In these views 1 indicates any suitable grip or upper end of a handle or stem 2 to the base of which a prong carrier is secured in any suitable manner, as by providing an angular tang 4 on the carrier to be driven into a recess in the stem base, which is shown inclosed by a protective metal tube or ferrule 3 of conical form such as is commonly used in farm forks.

On the prong carrier are projecting arms as 5, 6, in Fig. 1, or $5^a$, $5^b$, $5^c$ in Fig. 7. These arms may be radial and of any desired number, and there are prongs extending from them. One adjustable prong is shown on each arm 5, 6, and to each prong is affixed an earth treating member. Thus 7, 8, are bent or curved prongs, their tops $7^b$ and $8^b$ being slidable along the respective arms 5, 6 and fixable in any suitable manner as by screws $7^c$, $8^c$.

Prongs may be so shaped as to extend vertically or obliquely from the arms, and still be useful in many cases. The function of lateral bends $7^a$ and $8^a$ is to enable the arms to be kept short while allowing space for the branches of any plant which is to be left undisturbed between the prong and the axis or center of the tool. This center is occupied by a spike connected with the prong carrier, and while not necessary, still the spike is preferably detachably connected therewith in any suitable manner, for instance there may be a screw-threaded connection as shown. Thus instead of the spike being an integral or permanent part of the prong carrier, the separable arrangement permits of the use of spikes of different lengths and forms, and enables the spike to be readily renewed if it wears short, or breaks, or for other purposes.

Earth treating (such as weeding) members are shown in Figs. 1 to 3 as short shanked hoes 9, 10, with blades projecting inwardly and having any suitable edges to cut roots.

The direction of rotation is illustrated by arrows in Fig. 3, earth cutting edges or the like being foremost, and when there is a plant to be left standing, with close to it weeds, or other plants to be removed by way of thinning, the stalk of the plant to stay has room for it at C between a central spike 16 and earth treating members described later.

The sizes, shapes and functions of the blades or toothed parts of hoes, rakes and other soil cultivating blades are known to vary a great deal, and thus I may secure at will many different results.

I make the shanks 9, 10 so adjustable that the set or slope of any earth treating member or blade can be regulated, to make it pass through the soil at the angle desired.

A preferred adjustment means is seen in Figs. 4 and 5, each prong as 8 having recesses $14^a$, into which fit projections $10^a$ from each shank as 10, fixing means being used such as a bolt and nut arrangement 13 and 14. In Fig. 5 the shank is vertical, but in Fig. 2 they are inclined. Shanks can be riveted to the prong in cases where no adjustment is desired.

The blades as $11^a$, $12^a$, having cutting edges 11 and 12 can be set to extend outwardly only from the prongs as is in part dotted at $11^c$ in Fig. 1, or they may extend both outwardly and inwardly as predetermined. Any desired number of loose hoe or rake attachments are to be provided so as to allow of connection of any suitable ones by the user at will.

One or more rakes $12^a$ can be attached to the prongs instead of hoes as illustrated in Fig. 6, and may have teeth $12^b$, and cutting edges $12^c$; or I may attach a rake to one prong 8, and a hoe to the other 7.

Roots in the soil will in some cases be most easily lifted up by the aid of a rake attachment, and when only one rake is used it will naturally be rotated to the extent of 360 degrees, and if desired the rotation will be continued.

I find it an advantage to employ blades of hoes or the like which extend at an angle to the horizontal, with the points or parts nearest to the central spike higher than the other ends, which latter will cut deeper into the soil. This enables roots of a plant having a stem at C to be missed more easily during the rotation of the implement.

Having described this invention what is claimed by Letters Patent is:—

In a hand cultivator, the combination of a handle stem, a prong carrier secured to said stem, forming a continuation thereof and provided with lateral arms, a prong member for each of said arms, consisting of an upper portion slidably mounted on its complementary arm and an outwardly diverging and downwardly projecting lower portion, means for securing said upper portions of said prong members in their laterally adjusted positions on said arms, an earth treating implement mounted on the lower portion of each of said prong members, and a pivotal support for said cultivator, comprising a central spike detachably connected to said prong carrier, and extending beyond said earth implements in longitudinal alinement with said handle stem, substantially as described.

In witness whereof I have hereunto set my hand in the presence of two witnesses.

ALEXANDER ROSE.

Witnesses:
GEORGE G. TURIS,
BEATRICE M. LOWE.

Copies of this patent may be obtained for five cents each, by addressing the "Commissioner of Patents, Washington, D. C."